United States Patent [19]

Rauen

[11] 4,287,863
[45] Sep. 8, 1981

[54] POWER TRANSMISSION

[76] Inventor: John T. Rauen, 6190 Lodewyck, Detroit, Mich. 48224

[21] Appl. No.: 2,624

[22] Filed: Jan. 11, 1979

Related U.S. Application Data

[63] Continuation-in-part of Ser. No. 539,661, Jan. 9, 1975, abandoned, which is a continuation-in-part of Ser. No. 313,144, Dec. 7, 1972, Pat. No. 3,859,971.

[51] Int. Cl.$^3$ ............................................... F02B 5/00
[52] U.S. Cl. ................................. 123/432; 123/308; 308/3 CH
[58] Field of Search ........... 123/119 R, 197 R, 197 A, 123/197 AB, 197 AC, 32 ST, 32 SP, 122 A, 122 AA, 122 D, 75 B, 432, 308, 552, 545, 546, 308, 3 CH, 78 R, 78 B, 78 BA, 78 E; 92/126, 165, 178, 187

[56] References Cited

U.S. PATENT DOCUMENTS

| | | | |
|---|---|---|---|
| 1,405,403 | 2/1922 | Everett | 308/3 CH |
| 2,466,181 | 4/1949 | Myrick | 123/75 B |
| 2,484,009 | 10/1949 | Barber | 123/32 ST |
| 2,682,433 | 6/1954 | Maier | 308/3 CH |
| 2,968,297 | 1/1961 | Rauen | 123/119 R |
| 3,418,981 | 12/1968 | Von Seggern | 123/75 B |

OTHER PUBLICATIONS

Gill, Smith, & Ziurys, "Internal Combustion Engines", U.S. Naval Institute, Annapolis, pp. 6-14, 1959.

Primary Examiner—Ronald H. Lazarus
Attorney, Agent, or Firm—Whittemore, Hulbert & Belknap

[57] ABSTRACT

An emission control method is disclosed for the current, conventional, piston type, spark ignition, gasoline or equivalent fueled internal combustion engine having at least one cylinder. The method of the present invention increases the engine's fuel economy upwards of 70% from its current level. The emission control method being accomplished by engine modifications including a dual induction system adapted to provide to the engine a relatively low (lean) fuel content and therefore a relatively low power fuel-air mixture. This accomplishes an increased fuel economy and a substantially emission free exhaust, as pertains to the fuel alone. The dual induction system includes a heated intake supplying all of the fuel to the engine in a highly-heated state and a small percentage of the total inducted air, equally as highly heated. The dual induction system also includes an unheated and relatively much larger capacity cold air intake adapted to supply all of the unheated air inducted by the engine. The dual induction system enables a fuel-air mixture to be concentrated near the cylinder's usual spark plug to achieve a localized, initial, combustible charge thereat. Additionally, the unheated air intake of the dual induction system allows, in part, the engine's piston speed to be economically increased substantially beyond the conventional 3000 feet per minute commercial limit for adequately durable sliding piston reciprocating speed, and, an associated increase of the engine's crankshaft speed, to recover the potential engine power lost by the use of only the relatively low power mixture used in reducing the emissions. The modified engine includes also, a crosshead assembly associated with the dynamic action between said piston and the cylinder, which enables the modified engine to operate indefinitely at the power output and speed increases, or, as limited by sources other than the crosshead assembly associated with the dynamic action.

17 Claims, 10 Drawing Figures

POWER TRANSMISSION

CROSS-REFERENCE TO RELATED CASES

This application is a continuation-in-part of application Ser. No. 539,661 filed Jan. 9, 1975, now abandoned, which is a continuation-in-part of application Ser. No. 313,144 filed Dec. 7, 1972, and issued Jan. 14, 1975, as U.S. Pat. No. 3,859,971.

BACKGROUND OF THE INVENTION

The power output of a conventional gasoline fueled, automotive internal combustion engine is dependent upon the fuel content of the fuel-air mixture. The current typical automotive engines attain maximum power relative to any engine speed, with approximately eight percent fuel relative to the air, both by weight, in the mixture, which results in a "dirty" exhaust, including unburned hydrocarbons, carbon monoxide and nitrogen oxide gases. Further, the fuel-air ratio cannot be reduced in a conventional internal combustion engine, without severe loss of power, and without intolerable operational difficulties because its single induction system cannot concentrate at the cylinder's spark plug, sufficient fuel of a leaner mixture, to enable consistent ignition and/or adequate stoichiometrical combustion of the fuel and air mixture.

The maximum speed of a conventional internal combustion engine is limited in part by (1) the ability of the engine to "breathe", i.e., rapidly induct sufficient air to at least ninety (90) percent fill the cylinder, and (2) the piston reciprocating (sliding) speed. The normal maximum allowable engine speed of a conventional durable, commercial, internal combustion automotive engine is approximately four thousand five hundred revolutions per minute and based upon a maximum of 3000 feet per minute piston reciprocating speed. At greater speeds, the cylinders cannot be adequately filled with mixture, which results in loss of torque and power. A supercharger can significantly fill the cylinders at increased engine rpm, but it is additional equipment and expense. Assuming, however, that the engine speed were to be increased by supercharging a conventional internal combustion engine, the piston wear upon the cylinders' internal wall would prematurely destroy the cylinders and the pistons.

The disclosed internal combustion engine very nearly eliminates all emissions by enabling a substantial reduction of the fuel in the fuel-air mixture and offsets the potential power loss from such reducing of mixture proportions by enabling an increase of the engine speed beyond said normal mechanically allowable limits of piston reciprocating (sliding) speed. This increased piston reciprocating speed is permitted by utilizing a novel roller crosshead assembly which eliminates the connecting rod forces on the pistons and cylinders. These forces also wear the cylinders out-of-round and into an oval shape. As such wear is occurring, the piston rings commence allowing increased combustion gas leakage from the cylinder and into the crankcase to add to the emissions and the general air polluting situation. The roller crosshead eliminates such wear and such leakage. Furthermore, the worn oval shape cylinders allow engine lubricating oil, in the engine's crankcase, to be pumped by the reciprocating piston into the cylinder combustion portion above the piston heads, and thereafter incompletely burned, and exhausted from the cylinder in that state to form one contributor to polluting exhaust emission known as unburned hydrocarbons. This source of air pollution also becomes substantially nothing, by the crosshead usage. The only other known ways to rid the exhaust of this HC emission are with use of after burners pumping fresh air into the exhaust system in order to burn the HC products, or, by catalizing the exhaust products into nonpolluting, but highly offensive, odorous products; the latter mentioned ways adding to the mechanical complexity of the engine (power plant) and its initial and maintenance expense. The roller crosshead enables the above stated oil pumping situation to be eliminated by enabling the piston exterior surfaces between the piston rings and the wrist pin, to be sealed off from the lubricating oil in the engine's crankcase.

SUMMARY OF THE INVENTION

As described above, the disclosed internal combustion engine of this invention can run on a substantially leaner fuel-air mixture and therefore normally provides a substantially non-air polluting exhaust as derived from the fuel alone. This is accomplished by utilizing a dual intake system, such as disclosed in my U.S. Pat. No. 2,968,297. This system concentrates the fuel at the spark plug of the cylinders to eliminate misfiring that is encountered when conventional engines operate on a lean fuel-air mixture. With the dual induction system, the engine can operate satisfactorily on approximately a 4.8 percent overall fuel-air mixture, however, the power output is thereby reduced substantially proportionately as the mixture fuel content. This reduction in potential power output is offset by increasing the engine's speed beyond the known limitation of piston reciprocating (sliding) speed, requiring therefore in the preferred embodiment of the improved rolling crosshead utilized in the present invention, or, the functional equivalent thereof.

The improved roller crosshead of this invention eliminates the forces on the pistons resulting from the connecting rod thrust upon the piston during crankshaft rotation, which tends to wear oval the cylinder inside diameter. Taking the connecting rod thrust off of the piston permits the piston reciprocating (sliding) speed to be increased well beyond the present limitations. The roller crosshead assembly includes a roller which is rotatably received within a pair of opposed guides, within the cylinder, and which eliminates the connecting rod forces on the pistons. In the most preferred embodiment, the roller has a slightly crowned outer surface so that slight twisting of the connecting rod does not result in peripherally binding the roller and thereby hampering its free rotation. Further, in a conventional internal combustion engine, the piston skirt bears upon the cylinder and a minute clearance must be maintained between the piston skirt's outside diameter and the cylinder inside diameter to obtain quiet running. In the present invention, only the head portion of the piston is loosely fitted within the cylinder. The skirt portion clears the cylinder and extends within a cup-shaped member spaced from the piston skirt. This lack of contact with the cylinder enables the piston to run at a temperature less than, in conventional engines. The lessened heat, in part, makes the higher piston speed enduringly allowable. (See previous U.S. Pat. No. 1,608,811, which treats piston cooling means, and which forms a part of this invention). The cup-shaped member includes a sealing ring biased against the piston skirt, which prevents "blow-by" of combustion gas from the combustion portion of the cylinder, from entering the crankcase, and prevents lubricating oils from entering the combustion area of the cylinder. In the most preferred embodiment, the cup-shaped member includes locating surfaces to prevent rotational displacement.

The disclosed dual induction system includes an unheated air intake system adapted to supply substantially all (approximately 90%) of the air inducted by the engine cylinders and a hot intake system adapted to supply all of the engine's fuel requirements and a small percentage of the air (approximately 10%). The hot intake system includes a carburetor and a heater to heat the inducted air and fuel. The carburetor supplies substantially less than normal requirements of fuel for full power output of the engine at any specific speed, resulting in a potential power loss which is offset by the dual induction system in conjunction with higher engine maximum crankshaft rpm, or its equivalent piston reciprocating speed. The carburetor proposed by this application also includes a novel throttle lever mechanism interconnected with the accelerator pedal. This throttle lever arrangement: (1) prevents the engine from being overstressed while cold; (2) acts in conjunction with the overall features of this invention to provide a substantially reduced pollution-laden exhaust; and (3) enables a rich fuel-air mixture to be supplied to the engine during acceleration, whereby the power output of the engine may increase from that of the stated herein 4.8% to that of an 8% mixture which has about twice the power output of the 4.8% mixture, and also, emits more of the air pollutants of HC, CO and NOX. Such power output increase becomes equivalent to "down-shifting" an automatic transmission to acquire increased acceleration power and speed.

The crosshead guide means permits the pistons to float axially within the cylinders during their reciprocation and eliminates the forces of the connecting rods which otherwise would be borne by the pistons and their respective cylinders, and thereby permitting the engine to operate at a speed well above the normal limitation of piston reciprocating (sliding) speed. The engine crankshaft speed may then be increased to offset the potential power loss resulting from the lean fuel-air mixture. This is accomplished by the dual induction system, as described in my U.S. Pat. No. 2,968,297, incorporated herein by reference.

The roller crosshead permits also, a much larger ratio of piston diameter to piston stroke, than is otherwise mechanically allowable, whereby a shorter than usual piston stroke becomes advantageously mechanically practicable, which, in combination with a much larger than usual piston diameter enables the more desirable engine construction combination of: (1) a vertical or horizontal configuration; (2) one-half as many cylinders to achieve a specific power output; (3) approximately one-half as much total engine weight; (4) much higher crankshaft rotational speed to obtain as much and even more power per cubic inch of piston displacement, than currently being obtained with naturally aspirated (not supercharged) engines; (5) less or the same overall engine height from the crankshaft center of rotation to the top of the engine, as that of currently conventionally configured and constructed automotive engines, particularly, with crosshead usage, wherein normally the engine height becomes increased by as much as the piston stroke's length; and (6) in short, a smaller engine ensues, for a specific power output.

The dual induction system affords much larger than the conventionally normal limit of cylinder air intake valve area, whereby the usual overlapping of the opening of the cylinder's exhaust valve before closing of the cylinder's intake valve can be lessened or eliminated entirely, whereby lower than conventional engine crankshaft speeds can be had for good engine idling and with less than conventional engine idling exhaust emissions. It is well known in conventional engine design, construction and operation, to vary the timing of the intake and exhaust valve opening and closing relative to the specific position of the piston in the cylinder, to vary the power output and performance of any specifically constructed engine. Similarly, the ignition spark timing relative to said piston position in the cylinder has also been variable at will of either the engine builder, or engine operator. However, electronic ignition in recently past years has become to be preferred to the earlier make and break ignition system and is a part of this invention. Cylinder head combustion chamber shape is also a part of this invention, wherein either high or low air turbulence is selected to occur during at least the compression stroke of the four-stroke engine operating cycle.

The method for reducing exhaust emissions as disclosed by the present invention includes but is not limited to the following:

(a) A dual induction system for supplying an approximately 4.8% overall mixture of fuel and air into the cylinder;

(b) Rapidly forming subsequent ignitable mixtures within the cylinder to achieve with the approximately 4.8% overall mixture of fuel and air a power output equivalent to the power output of a conventional 8% mixture, such as used in unmodified conventional engines;

(c) Providing a larger than normal cylinder air intake valve area;

(d) Modifying the usual overlapping of opening and closing for the cylinder's exhaust and intake valves by providing a zero valve overlap which is accomplished by modifying the camshaft to give a valve timing wherein the exhaust valve is closed before the intake valve opens during the intake stroke;

(e) Providing a cylinder head combustion chamber shape for either high or low air turbulence to occur during the compression stroke of the operating cycle the shape, once established in the cylinder head, remains unchanged;

(f) Providing a carburetor for each cylinder;

(g) Increasing the piston sliding speed to a speed in excess of 3000 feet per minute to compensate for the power loss to a lower power mixture;

(h) Providing approximately a 1.43 increase in miles per gallon of fuel for any size vehicle, when it is driven by the modified engine of the present invention as compared to the mileage derived from a conventional engine;

(i) Providing a vacuum-operated automatic throttle and other modifications as incorporated herein by my U.S. Pat. No. 2,968,297;

(j) Providing a 3.87 to 1 cylinder area to piston stroke ratio where the piston stroke becomes a numerical quantity equal to less than 25.9% of the cylinder area;

(k) Providing a manual throttle opening position for producing a vacuum for cold starting as also provided in my previously mentioned patent;

(l) Including oil control devices for preventing oil from being pumped by the reciprocating action of the engine's piston from the crankcase during at least engine idle speed operation;

(m) Including means shutting off the fuel supply to the engine during deceleration as provided by my previous patent;

(n) Providing oil cooling of the piston if needed to get the high piston speed desired which can be accomplished by running a stream of oil under the piston for cooling (see my previous U.S. Pat. No. 1,608,811), also;

(o) Providing conventional electronic spark ignition to the modified engine whereby the combustion of the final 4.8% fuel and air mixture becomes more enduringly consistent;

(p) Producing low air turbulence in the induced air during the compression stroke by providing a hemispherical shaped combustion chamber;

(q) Providing high air turbulence in the inducted air during the compression stroke for aiding in concentrating sufficient of the fuel in the cylinder at the cylinder fuel ignition means for consistent ignition of the fuel in the air in the cylinder;

(r) Keeping the piston head insulated by a layer of stainless steel to reflect combustion flame back onto itself whereby the piston does not become over-heated;

(s) And, providing the same power with a modified engine using a 4.8% overall fuel and air mixture as an unmodified engine using a 8% mixture.

Other advantages and meritorious features of the disclosed emission control system and modifications of the conventional internal combustion engine will be more fully described in the following description of the preferred embodiment, the appended claims and the attached drawings.

DESCRIPTION OF THE PREFERRED EMBODIMENT

Figure 1:
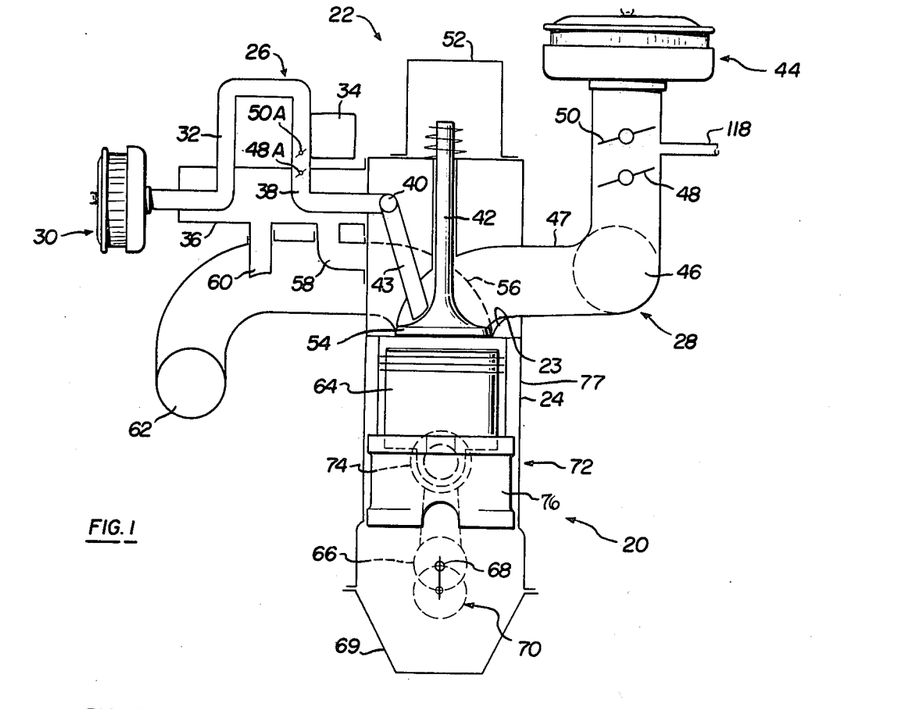
FIG. 1 is a schematic illustration of the improved internal combustion engine of this invention.

FIG. 1 illustrates schematically one embodiment of an internal combustion engine 20 having a dual induction system 22, such as shown in my above referenced U.S. patent. The dual induction system described in my above referenced patent is adapted to increase the engine speed, and the disclosed invention utilizes this dual induction system to reduce the emissions of the engine, including unburned fuel and oil hydrocarbons, carbon monoxide gas and oxides of nitrogen. As described above, these emissions result from the utilization of a rich fuel-air mixture containing about 8% fuel relative to air, by weight, which is required by the conventional engine having a single induction system. The dual induction system supplies the fuel to the inlet port 23 of the cylinder 24. In the case of the present engine having more than one cylinder, a carburetor can be supplied to each cylinder. This eliminates the manifolding usually employed, and its hindrances to equal mixture distribution to all manifolded cylinders, higher engine speed, and higher power output. The usual manifold is provided with only one carburetor having manifolded fuel mixture supplying passages leading to more than one cylinder. The dual induction system is adapted to convey the fuel to the inlet port 23 and concentrates it at the cylinder spark plug, and since it does not convey fuel in the cold intake system, then the cold intake system can be of any area size needed to attain any elected engine maximum speed. It has now been found that the dual induction system permits the engine to run on a leaner fuel-air mixture, which results in a clean, essentially emission free exhaust.

The dual induction system includes a hot intake system 26 which supplies a small percentage of the air inducted by the engine cylinders and all of the fuel. The cold air intake 28 supplies the remainder of the air inducted by the engine.

The hot intake includes a conventional air cleaner 30 which provides the air inlet port, an air passage 32 to the carburetor 34, a heater 36 which heats the fuel and air mixture in the mixture passage 38 and an intake manifold 40, when manifolding is used, which distributes the fuel-air mixture to the cylinder inlet valves 42, through passage 43. Air intake passage 32 may also include a pair of valves 48A and 50A in accordance with the teachings of my U.S. Pat. No. 2,968,297. As is more fully discussed in my previously mentioned patent, valve 48A is interconnected with a valve 48 in the cold intake manifold, with both these valves being manually regulated by an interconnection to the car's accelerator pedal. As will be more fully discussed below, valve 48A is interconnected to a throttle lever mechanism for regulating the supply of fuel to the engine cylinders. Valve 50A is interconnected with a valve 50 in the cold intake manifold, in accordance with the teachings of my previous patent.

Cylinder 24 includes the usual outlet valve which does not appear in schematically illustrated in FIG. 1, because the outlet valve is positioned on the other side of the cylinder from inlet valve 42.

The cold-air intake 28 also includes a conventional air cleaner 44 and passage means 46 when a multicylinder engine is manifolded. The cold-air intake 28 also includes a manual throttle valve 48 and an automatic throttle valve 50, as described in my above referenced U.S. patent. The cylinder exhaust and intake valve operating mechanism is enclosed within the cover plate 52. In operation, a small percentage (for example 10%) of the air enters through air cleaner 30 and line 32, where it is mixed with all of the engine's fuel requirements at carburetor 34. Throttle valves are provided in the fuel-air passage 38, as described in my above referenced patent, and the fuel-air mixture exits from the hot intake system at the head 54 of the inlet valve 42, as shown in FIG. 1. The inlet valve 42 and the inlet port 23 are larger than normal, as described in my above referenced patent, to allow a greater volume of air to pass through the cold-air intake 28.

Figure 6:
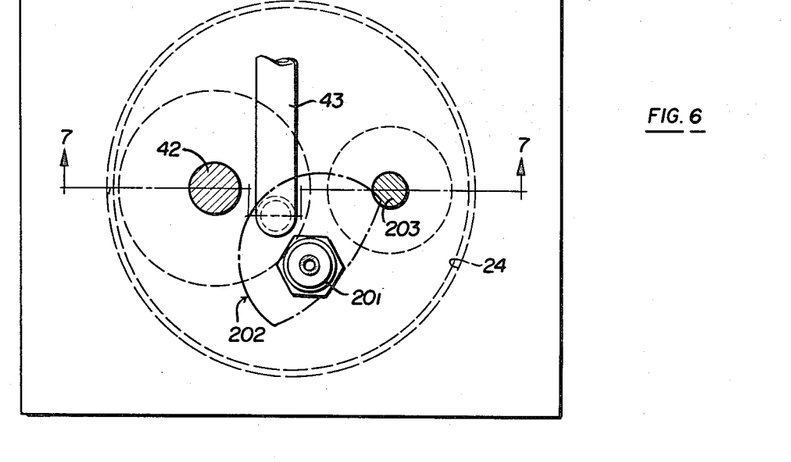
FIG. 6 is a generally schematic, plan view of a cylinder, illustrating the manner of concentrating the fuel-air mixture near the spark plug.
Figure 7:
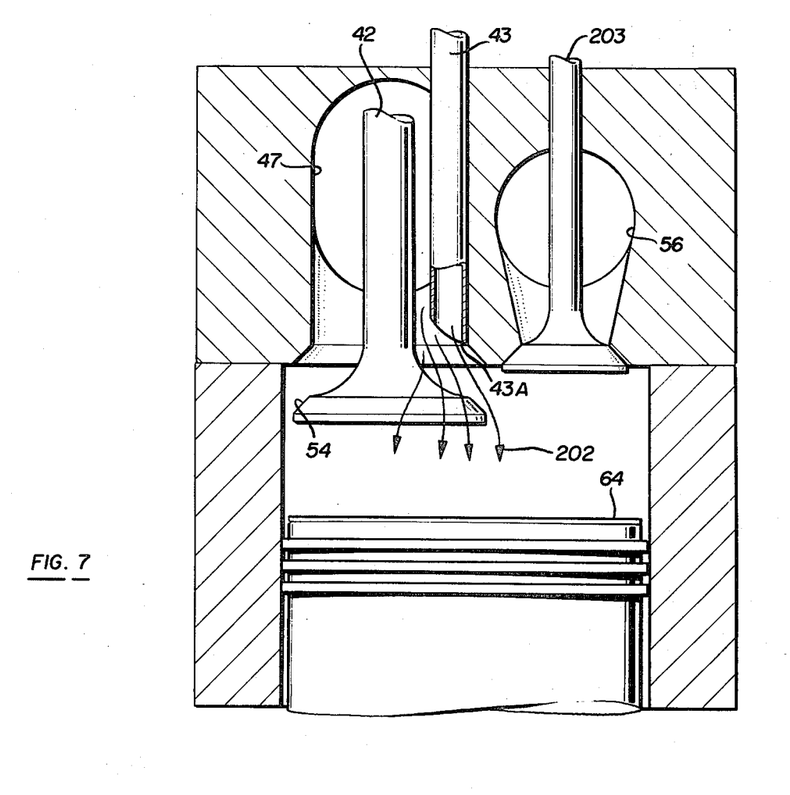
FIG. 7 is a generally schematic, side view of the cylinder shown in FIG. 6, taken generally along line 7—7.

Turning now to FIGS. 6 and 7, the operation of the piston intake and exhaust strokes will be more fully explained. Fuel is supplied by the carburetor 34 to one of the intake systems 26 in varying amounts, but in only one mixture during various engine load and temperature requirements, as will be more fully discussed below. During normal fully heated engine operation, however, fuel will be supplied to the hot intake system in such amounts as to achieve an approximate overall 4.8% fuel content in the cylinder. For example, if the hot intake supplies approximately 10% of the total air volume inducted by the cylinder, then the fuel content in the heated mixture will be approximately 48.9%. This mixture is heated by a heater 36 and supplied to a passage 43. As illustrated in FIG. 7, passage 43 terminates in an end 43A which is complementary in shape to the head of intake valve 42. Thus, when intake valve 42 is closed, passage 43 is closed.

As intake valve 42 is opened, the heated fuel-air mixture from passage 43 and the cold air from the passage 47 are drawn into cylinder 24 by a piston 64. FIGS. 6 and 7 graphically illustrate that the heated fuel-air mixture flows over the intake valve head and is distributed generally in the region 202 of a spark plug 201. As the piston draws the cold air into the cylinder the heated fuel-air mixture becomes diluted and dispersed to an entent. However, when the piston is reciprocated, upwardly toward a top dead center position, and at the moment of an ignition spark, the fuel-air mixture in the vicinity of the spark plug is within the combustible range, i.e., from about 7 to 13% fuel. (It will be understood, of course, that the range of combustion may be as great as about 6-15%, depending on predetermined combustion chamber configurations.) Therefore, two regions of fuel content exist within the cylinder: (1) a "primary mixture" region wherein fuel is present in a combustible quantity of about 7-13% by weight of the air; and (2) a secondary region wherein the fuel is present in a quantity less than about 4 or 5% and therefore is incapable of being consistently ignited by an igniting spark. It is understood, of course, that the fuel in the "secondary mixture" region is burned in response to the ignition of the fuel in the "primary mixture" region.

It will be understood, too, that because air and fuel have no affinity for one another, the fuel must be dispsersed within the air within the cylinder to accomplish a combustible mixture. This is achieved in the present invention by the combination of pneumatic turbulence of the air being inducted during the intake stroke and the turbulence of the compression stroke of the engine's cycle, and by the fluid flow characteristics of the dual induction system. The latter of which, concentrating in the spark plug region of the cylinder's combustion chamber, a spark ignitable fuel ladened mixture within the well known combustible range of the mixture, which by weight, is 6% to 13% of the air in the mixture. The combustion chamber preferably being of the hemispherical shape to accomplish the desired degree of fuel dispersion by the turbulence.

It must be noted at this point that the present invention further contemplates that substantially all, and preferably entirely all, of the fuel will be vaporized at the time of combustion in order to promote substantially complete combustion, whereby unburned hydrocarbon emissions are eliminated. The vaporization in the disclosed embodiment is accomplished by a variety of factors, for example, the heated intake system, flowing the heated fuel-air mixture into a heated cylinder over a heated intake valve, the compression stroke of the piston, and combustion of the fuel within the cylinder during the power stroke of the piston.

Applicant incorporates the following references into this disclosure to illustrate the operability of his overall invention: SAE Paper No. 380F; 974B; SAE Paper No. 720254; SAE Paper No. 740105 and SAE Paper No. 741156. Although each of these references substantiate the operability of Applicant's overall invention, they each fail in material respects to suggest the total claimed combination set forth herein.

SAE Paper No. 740105, for example, recognizes the feasibility of using a lean fuel-air mixture to reduce oxides of nitrogen and carbon monoxide, but expresses the concern that unburned hydrocarbons will be produced because of misfiring. The present invention overcomes that problem (which problem is recognized on page 6, column 1, line 24 of SAE Paper No. 974B) by concentrating the fuel at or near the spark producing element. Further, the present invention (as more fully disclosed discussed below) enables a greater piston reciprocation speed to recoup the power loss from the leaner mixture. Overall, the present invention provides a non-obvious solution to a current problem of major national concern.

The cylinder exhaust gas exits through opened outlet valve 203 and outlet passage 56 to the inlet 58 of the heater 36. The hot gases heat the incoming air in line 32 and the fuel-air mixture in line 38, as described above. The exhaust gas leaves the heater through line 60 and finally through the exhaust pipe 62. As described above and in my referenced U.S. patent, the dual induction system shown in FIG. 1 results in an increased engine speed. The speed of an internal combustion engine having the dual induction system shown in FIG. 1, is limited only by the mechanically allowable sliding speed of the reciprocating pistons because the dual induction system overcomes the problems encountered with a single induction system, namely that of supplying sufficient fuel laden air to the cylinders at engine piston speeds higher than the current conventional speeds of 3000 feet per minute. Such speeds are not attainable without the aid of the well known supercharger which forms first problem. A second problem is maintaining a fuel laden air supply to the engine at very low engine speeds, with a full open throttle when the single system is made large enough to prevent the need of supercharging. Thus, when the single sysetem is made small enough, the engine speeds becomes limited to the currently conventional maximum speeds. The disclosed embodiment of the internal combustion engine of this invention provides an emission free exhaust within the U.S. Clean Air Act of 1970 and utilizes increased engine speed to maintain the former level of maximum power per cubic inch of engine piston displacement that the engine was capable of prior to application of emission controls. The carburetor 34 supplies approximately one-half (4.8% mixture) the normal fuel requirements of that mixture (about an 8% mixture) which produces maximum power for any given piston speed.

A conventional internal combustion engine requires a mixture in which the fuel thereof is approximately an eight percent of the air therein, by weight of each element, for maximum power output at any specific piston or crankshaft speed. The disclosed embodiment of the internal combustion engine operates on approximately one-half this amount of fuel in the above mentioned mixture or about a four to five percent fuel and air mixture. The utilization of even a 6 percent fuel air mixture in a conventional internal combustion engine is drivably intolerable. It results in operational hesitancy and stalling inoperability of the engine because the fuel in the air cannot be so distributed adjacent the cylinder spark plug to assure consistent ignition of the fuel in the combustion area of the cylinder. The disclosed dual induction system delivers the fuel to the inlet port 23, and concentrates it at the spark plug of the cylinders, as described above, since the spark plug is located near the exit of the tube 43 and thereby produces consistent ignition of the fuel and thereby acceptable drivability of the engine.

The internal combustion engine shown in FIG. 1 also includes a plurality of cylinders 24, normally, 4, 6 or 8, and pistons 64 thereof, connecting rods 66 interconnecting the crankshaft crank pin 68 and the pistons 64 and causing the pistons to reciprocate within the cylinders 24. The swing of the crank pin and the crank pin end of the connection rod 66 is shown schematically at 70 in FIG. 1. As stated above, the dual induction system utilized in the internal combustion engine of this invention enables the engine normal crankshaft rotational speed, to be increased well beyond the known limits of the associated piston sliding speed for a given crankshaft rotational speed. A conventional automotive internal combustion engine operates at approximately four thousand five hundred revolutions per minute and within 3000 feet per minute piston speed; however, the disclosed internal combustion engine will allow piston speeds in excess of this, regardless of the associated crankshaft speed. This increase in piston speed offsets power loss from the utilization of the substantially emission free, lean low power fuel-air mixture described above. The increased engine speeds, in the disclosed embodiment of the invention, are permitted by the utilization of a unique crosshead assembly 72, which is an adaption of a double acting piston type steam engine construction to a single acting piston type internal combustion engine shown schematically in FIG. 1 and completely in FIGS. 2 and 5. The assembly 72 includes a guide member 76 for the piston end of the connection rod 66, which in this embodiment of the invention is a roller assembly 74, all of which are described below. The roller assembly 74 can be substituted by a sliding member since it is not exposed to the heat a piston is and can be adequately cooled and lubricated.

However, the roller 74 is preferred. The crosshead assembly is shown in detail in FIGS. 2 to 5, wherein FIG. 3 shows one embodiment of a cylinder block 77, including a plurality of cylinders 24 and reciprocating pistons 64 in the block 77. Only one cylinder assembly will be described hereinbelow, however, it will be understood that the internal combustion engine of this invention may include any number of pistons and cylinders, as known in the prior art. This disclosed internal combustion engine is an automotive gasoline fueled engine, however, the disclosed invention may also be utilized with other suitable fuels.

Figure 2:
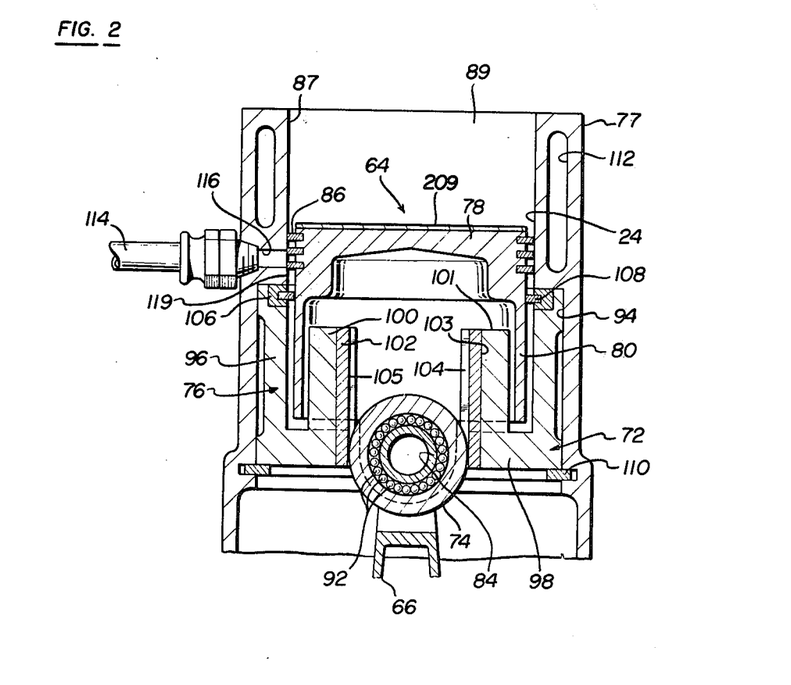
FIG. 2 is a side cross-sectional view of the roller crosshead assembly and one engine cylinder.
Figure 3:
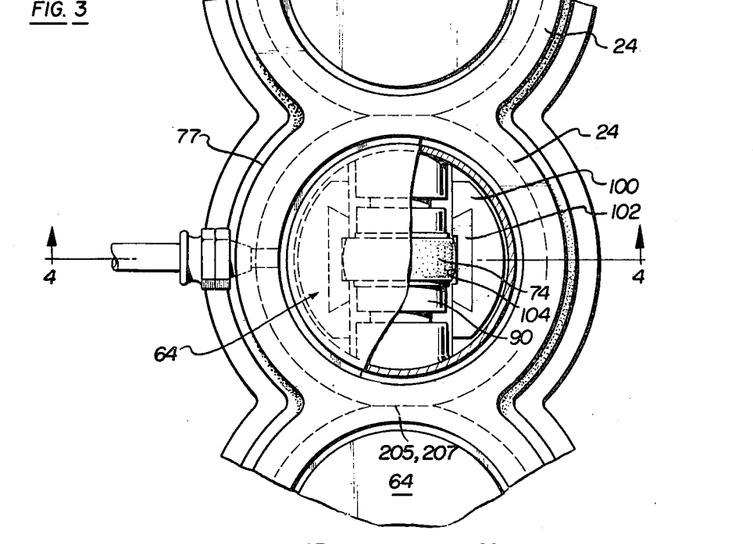
FIG. 3 is a partial top elevation of the engine cylinders, partially broken away to show the rolling crosshead.

The piston disclosed in the roller crosshead assembly 72 of this invention may be of general, conventional construction, including a head portion 78, a cylindrical annular skirt portion 80, as shown in FIG. 2, and a pair of wrist pin bosses 82, which receive the wrist pin 84 for securement of the pistons 64 to the connecting rod 66. The piston normally includes the well known plurality of rings 86 which sealingly engage the internal wall 87 of the cylinder to prevent excessive gas leakage past the piston.

Figure 4:
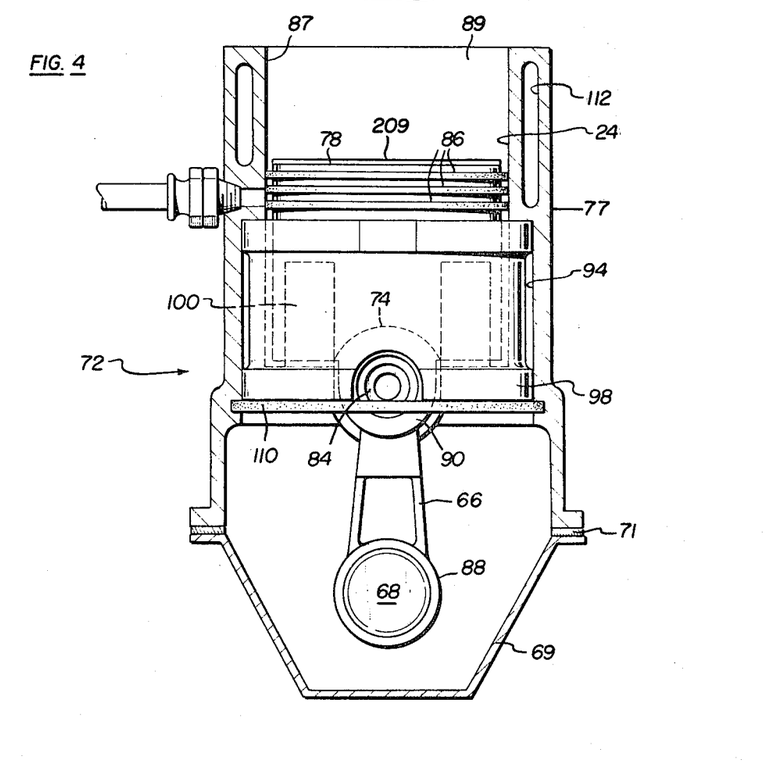
FIG. 4 is a partial cross-sectional view of FIG. 3, in the direction of view arrows 4—4.
Figure 5:
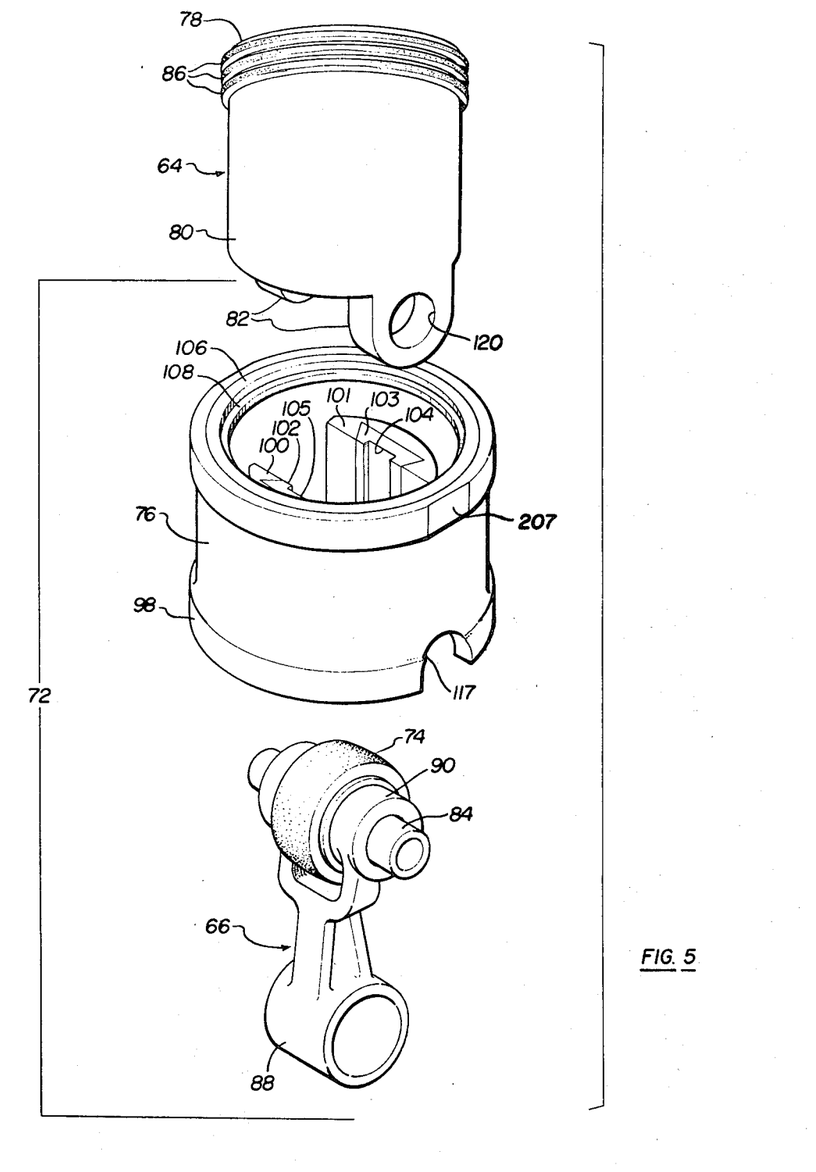
FIG. 5 is an exploded view of the roller crosshead assembly and piston.

The unconventionally constructed connecting rod 66 includes a crankshaft boss 88, which rotatably receives the crankshaft 68, as shown in FIG. 4, to permit the crankshaft to rotate within the connecting rod boss. The crankshaft 68 is enclosed within a conventional crank case 69, as shown in FIG. 4, which normally includes a seal 71. The opposed end of the connecting rod 66 includes a wrist pin boss 90 which receives the wrist pin 84 and the roller assembly 74 rotatably mounted on the wrist pin, as shown in FIGS. 2 and 5. The roller assembly 74 preferably includes an anti-friction bearing of the roller type containing rollers or needles 92, as the rollers are generally called and shown in FIG. 2. The roller assembly 74 is rotatably received in the guide member 76, which will be described hereinbelow. As best illustrated in FIG. 3, roller 74 may be "crowned" on its outer (diameter) surface in the axial direction so that any minute twisting of the connecting rod will not result in binding the outer diameter in the guideways and prevent the free rotation of the roller and resulting in possible damage to the guide surfaces and the roller.

The guide member 76 is mounted within a counter-bore 94 in the cylinder 24, as shown in FIGS. 2 and 4. The preferred embodiment of the guide member is cup-shaped and includes a cylindrical portion 96 and a base portion 98 having an open end for admission of connecting rod 66 and roller assembly 74, as shown in FIG. 2. As illustrated in FIG. 5 (and in phantom in FIG. 3) flattened locating surfaces 205 and 207 are provided on each cup-shaped member to engage similar surfaces on adjacent members to prevent rotational displacement thereof. Thus, the locating surfaces 205, 207 constitute means for rotationally stabilizing the cup-shaped members. Of course, other similar types of rotational preventing means may be employed.

Two protrusions 100 and 101 formed integral with, and extend from the base 98, toward the piston, as shown in FIG. 2. The protrusions include wear resistant inserts 102 and 103, as shown in FIGS. 2, 3 and 5; each insert having an opposed channel 104 and 105 which rotatably receives the roller assembly 74, as shown in FIG. 2.

The heat generated on both the cylinder and the piston, normally associated with the rotation of the crankshaft 68 and the thrust of the connecting rod 66 upon the piston 64 and the cylinder 24, are thus eliminated by the crosshead assembly 72, shown in FIGS. 2 to 5. Rotation of the crankshaft 68 will move the end 88 of the connecting rod in a circle, as shown at 70 in FIG. 1, causing reciprocation of the piston. The forces of connecting rod 66 are taken up by the roller assembly 74, which is guided within the channels 104 and 105 in the guide member 76, substantially eliminating any sliding and therefore frictional forces on the pistons. The pistons are thus free to float in the reciprocating axis of the cylinder, permitting the greater engine speeds described above.

It will be further noted that the skirt portion 80 of the piston 64 is not in contact with the cylinder 24, and extends into the cylindrical portion 96 of guide member 76. All of the piston clears the cylinder 24, thereby eliminating the accurate tolerances which must be maintained in the conventional piston-cylinder construction. In the disclosed embodiment, the guide member 76 also includes a seal retainer insert 106, adjacent the upper end of the guide, which receives and retains a sealing ring 108 biased against the skirt portion 80 of the piston 64. The sealing ring seals the space between the piston skirt and the guide member, which prevents combustion gases blown past piston ring 86 from entering the crank case 69 and lubricating oils from entering the combustion area 89 of the cylinder. Though not disclosed in the embodiment of FIG. 2, it is to be understood that more than one sealing ring 108 can be used, and in addition thereto, a conventional oil control (scraper) ring may be used to more effectively retain lubricating oils within the engine crankcase. The advantages of this structure are those of rugged construction, assembly and service simplicity and their associated engine economics.

The guide members 76 is retained in place by the retaining ring or snap ring 110. The roller crosshead assembly 72 is an important advantage in any piston type internal combustion engine, but is particularly important in high speed engines which this invention can gainfully be, but not necessarily limited to only high speed engines.

The engine cylinder 24 also includes a plurality of channels 112 which receive the normal engine coolant and an outlet line 114 to receive the blow-by gases through port 116 for conventional recycling into the induction system and the cylinder 24. For example, the blow-by gases may be exhausted through line 114 to line 118 in FIG. 1, between the manual and automatic throttle valve 48 and 50, respectively. Alternatively, the exhaust gases may be channeled to a crankcase venting system, such as disclosed in my U.S. Pat. No. 3,338,222. In the latter case, the line 114 would be connected to line 34 in my above reference patent.

The guide member 76 is provided with two semi-circular openings 117; each opening being diametrically opposite the other, and penetrating the cylindrical portion 96 of the guide member 76. These openings 117 allow free admission of the wrist pin 84. Referring to FIG. 5; during assembling of the guide member 76, the piston 64, the connecting rod 66, the roller assembly 74 and the wrist pin 84; the piston 64 is placed head down upon a rest surface, causing thereby, the piston wrist pin bosses 82 to be uppermost. The guide member 76 is then passed downwardly over the piston until the base 98 portion of member 76, rests upon the end of the piston skirt 80. In this position the wrist pin boss holes 120 and the guide member 76 semi-circular openings 117 are aligned. The connecting rod 66 and the roller assembly 74 are then temporarily assembled by aid of an aligning pin temporarily serving as the wrist pin 84, and passed through the connecting rod and the roller. This temporary assembly is then brought inside the piston bosses 82, which are available as described above. The wrist pin 84 is then passed through the bosses 82 and the connecting rod 66, the roller assembly 74 and onward and through the second wrist pin boss and in so doing forcing out the aligning pin mentioned above. This forms a one-piece assembly of the members shown in FIG. 5, which can then be readily assembled into the cylinder and retained by ring 110. The wrist pin 84 is retained in place by an interference fit of pin 84 and the connecting rod boss.

As described above, the unique rolling crosshead assembly 72 shown in FIGS. 1 to 5 permits an increase in engine piston reciprocating speed above the commercially known mechanical allowable limits of piston reciprocating (sliding) speed of current commercial automotive engines. The disclosed rolling crosshead 72, then, permits utilization of a lean (low power) fuel-air mixture, which results in substantially pollution free, exhaust gases, since the increase in engine speed effected by the combination offsets the potential power loss resulting from the use of the lean, low-power, fuel-air mixture.

As mentioned very briefly in the early portions of this disclosure, the present roller cross head assembly may be used without enlarging the distance between the centerline of the crankshaft and the top of the piston 64. One manner of accomplishing this includes maintaining the total volume of a specific engine cylinder. For example, the total stroke of the piston can be reduced to maintain the distance under consideration. To maintain the volume, the bore of the cylinder must be enlarged. This, however, causes an increased heat loss to the engine cooling system by way of enlarged piston head. Therefore, to reduce the heat loss, the present invention proposes an optional heat shield 209. This heat serves to protect the piston from unduely high temperature while performing the method of the present invention. The heat shield 209 may consist of any suitable, low heat conductive material, for example, such as a material known by the trade name as AUSTENITIC iron, which can be cast in place with the piston made of low expansion aluminum alloy.

A 4.8% mixture is a clean burning mixture leaving substantially no carbon deposits within the combustion chamber, nor, upon the piston head, and exhaust passages (just as a blue flame of a natural (methane) gas combustion, contains so little fuel that it leaves no soot upon cooking utensils, similarly of gasoline combustion). Thus, the heat shield would most preferably be highly polished to achieve reflecting back into the cylinder some of the combustion heat, and thereby run cooler.

The present application further discloses an optional, novel throttle lever mechanism (shown in FIGS. 8 and 9) for regulating the opening and closing motion of valve 48A. As disclosed in my previous U.S. Pat. No. 2,968,297, a fuel metering system is regulated by a thermostat and a thermostat rod which is connected to a fuel metering pin. (For a more complete discussion of this arrangement, reference is made to Columns 5 and 6 of my previous patent.) The thermostat rod disclosed previously includes an arm 184 and a finger 186. For simplicity, the entire thermostat and fuel metering system is not shown in the present disclosure, since the structure may be identical; however, the finger element 212 shown in FIG. 8 should be considered the same as finger element 186 of my previous patent.

The novel throttle lever system of this application includes a shaft 214 which extends through intake passages 32 and 38 of FIG. 1 and on which the manually operated valve 48A is mounted. An actuating component 216 is rotationally mounted on shaft 214, and is secured thereon in a conventional manner so that the lever 219 may rotate freely about shaft 214 and independently of lever 222. Component 216 includes an upstanding arm 218 having an opening 220 to receive a manually operated interconnecting member, as more fully disclosed in my previous patent. Thus, shaft 214 and lever 219 are rotated by said interconnecting member in response to depression or release of the vehicle's usual accelerator pedal. Component 216 also includes finger 238, and surface 240.

A second component of the throttle lever mechanism, i.e., member 222, is rigidly mounted on shaft 214, and therefore by means of spring 224 causes the rotation of shaft 214 and valve 48A, as more fully discussed below.

Lever member 222 is interconnected to component 219 by way of a spring member 224. Thus, when component 219 is rotated in a clockwise direction about shaft 214 in response to said accelerator pedal depression, spring 224 rotates member 222 a corresponding amount. This is accomplished when the engine is fully warmed up and finger member 212 is fully advanced to the upper position illustrated in FIG. 8. Accordingly, depression of the accelerator pedal will cause rotation of component 216 and shaft 214; this in turn will cause rotation of member 222 (through the spring 224 interconnection) and the valve 48A will be opened to allow a greater quantity of fuel-air mixture to be drawn into the cylinder to maintain the fuel content in the cylinder at a desirable level for proper engine operation in accordance with the teachings herein.

Member 222 includes a cam surface which cooperates with the thermostat finger 212, as follows. Assuming that the engine is cold (below 70° F.) and is being started, the finger 212 will be at its lowest possible position, as illustrated in phantom in FIG. 8. Correspondingly, the fuel metering system, as more fully discussed in my previous patent, will be supplying a very rich mixture to the cylinders, as is conventional in the art for a cold start, fuel-air mixture. Then, immediately subsequent to initial firing of the cranking engine, the accelerator pedal is depressed to initiate a fast idle, engine running state. In so doing, the component 216 is rotated clockwise as viewed in FIG. 8, and member 222 likewise rotates clockwise under the action of spring 224. This rotational movement causes a pyramid-shaped portion 228 of cam surface 226 to engage the finger 212 and move it upwardly to a position at the tip of the pyramid, to cause a fuel content reduction in the mixture supplied to the hot intake system. This is done so that the cold engine inducts only sufficient mixture to continue running immediately following engine start up, as is fully described in my previously mentioned U.S. Pat. No. 2,968,297. This setting of the fuel metering system minimizes the atmospheric polluting exhaust emissions during this phase of the operation. It also prevents overstressing of the engine under cold conditions after the engine having just been started. As shown and disclosed in my previous patent, a stop retaining the opened throttle position is moved into the path of screw 242 when pyramid surface 228 raises finger 212. Thus, if the manual effort on the accelerator is relaxed, the engine runs at a fast idle speed until warmed up, since the throttle cannot close fully. With the throttle in the position with the pyramid point 228 under the finger 212, a "warmup mixture" is supplied to the engine. If the vehicle is to be driven, while still cold, depression of the accelerator pedal causes the rotation of member 222 so that finger 212 will lower to engage surface area 230. As a result, a "cold full power mixture" will be supplied to the cylinder, with the fuel content being greater than the hot full power mixture of normal driving, as is somewhat conventional in the art. Thus, even if the operator fully depresses the accelerator, member 222 cannot rotate more than approximately one-half of full open rotation (to open valve 48A only approximately one-half) because finger 212 will strike surface 234. This is provided so that the engine under load, or not, cannot be overstressed before it is fully warmed up, and so that polluting emissions will be minimized. Thus, the speed of the engine is also reduced to optimize fuel economy. Accordingly, even though the throttle valve of the carburetor is being limited to a half-open position, sufficient fuel is being supplied to the engine for adequate power output purposes, which includes adequate vehicle cold speed operation.

Figures 8, 10:
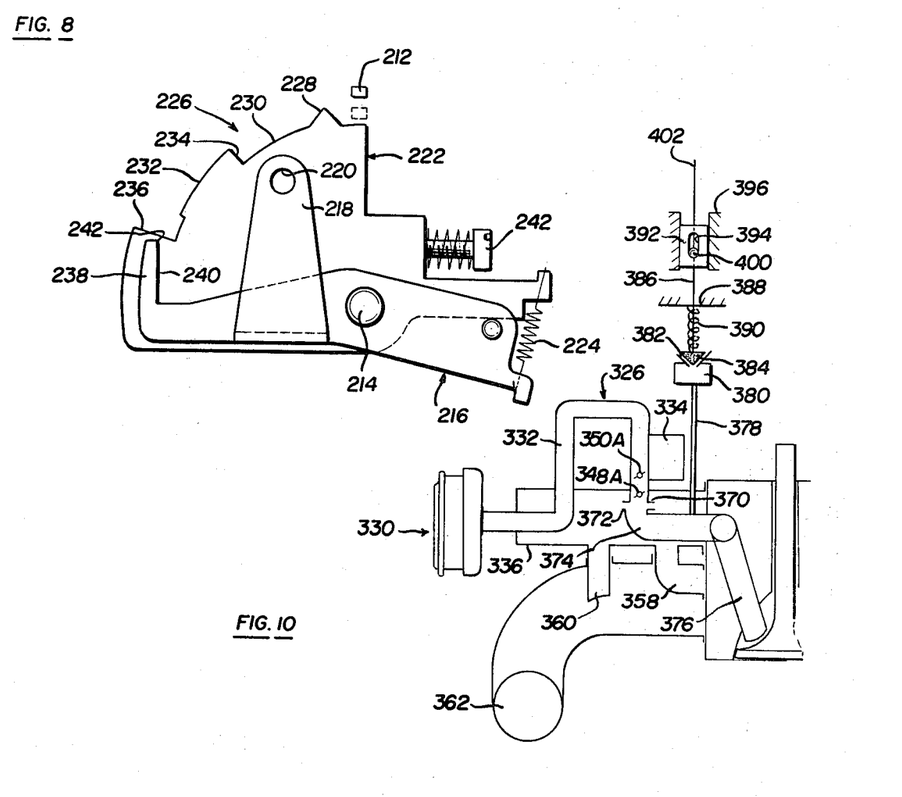
FIG. 8 is a side view of the novel throttle lever arrangement proposed by the present invention.
FIG. 10 is a schematic illustration similar to FIG. 1, but illustrating a further feature to the present invention.

Once the engine is fully warmed up, finger 212 of the thermostat rod will have been raised to the uppermost position shown in FIG 8, and member 222 can then be rotated to its full extent, i.e., until finger 212 strikes surface 236, which corresponds to a wide open throttle position.

It will be realized, of course, that whenever member 222 is prevented from rotating, for example when finger 212 engages surface 234, and when the accelerator pedal is fully depressed, component 219 will simply rotate freely upon shaft 214 and thereby stretching spring 224. Thus, even though the accelerator pedal may be fully depressed before full engine warmup, the power output of the engine is limited by the novel throttle lever arrangement. Thus, the engine cannot be overstressed as stated previously herein.

A further novel feature proposed by the present throttle lever mechanism includes the provision of a finger 238 and an inclined camming surface 240 on finger 238. Assuming that the engine is fully warmed up so that finger 212 is in its uppermost position, member 222 can then be rotated to a wide open throttle position established by stop 236 on lever 222, with the overall fuel content supplied to the cylinders being approximately 4.8% of the total inducted air. This provides a specific degree of vehicle acceleration. In the event that a greater degree of acceleration is wanted, then the accelerator pedal can be depressed more to cause further rotation of component 219 so that inclined cam surface 240 engages and lowers finger 212, so that the fuel metering system provides a richer mixture. It must be noted that surface 240 is inclined, and that point 242 is generally aligned with the top of finger 212. Thus, as finger 212 is lowered by engagement with inclined surface 240, the fuel metering pin will also be lowered to provide an acceleration fuel-air mixture of approximately 8%. The finger 212 stops further rotation of lever 219, and the extended spring 224 holds the throttle valve 348A full open. The ensuing increase in engine poer output is associated with more exhaust emissions, but may become in later time, to be allowable, since an 8% mixture versus the 4.8% mixture, substantially doubles the engine's power output. The result can be likened to "down-shifting" an automatic transmission. The duration of such power output being, generally, of very short periods of time and at infrequent instances. This feature may enable the elimination of the fuel pump disclosed in my previous patent.

Figure 9:
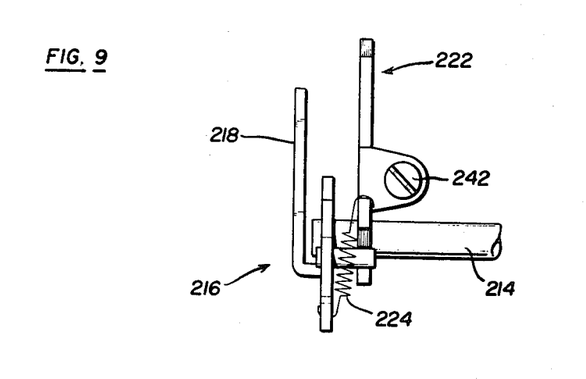
FIG. 9 is a frontal view, illustrating the throttle lever arrangement.

It can also be seen from FIGS. 8 and 9 that an adjustable throttle stop screw 242 is threaded into member 222 for engaging an abutment (not shown here in FIGS. 8 and 9, but disclosed in my previous patent) to limit the extent to which the manually operated throttle valve 48A may be closed.

In summary, the novel throttle lever system is designed to provide the following operational modes: (a) a cold-start fuel-air mixture; (b) a warm-up, fast idle mixture when pyramid-shaped cam surface 228 engages and raises pin 212; (c) a limited full power mixture during warmup with a limitation of one-half throttle valve opening until the engine has fully heated up; (d) a hot 4.8% fuel-air mixture for normal driving; and (e) a hot 8% fuel-air mixture for acceleration purposes.

The discussion herein relating to the engine being "fully warmed up" means, for example, when the engine's liquid coolant reaches approximately 150° F. Of course, this may vary according to the engine operational characteristics or as desired. If an air-cooled engine is used, a different parameter would of course have to be used.

The present application also proposes an optional supplementary air supply system for the heated intake passageway, as illustrated in FIG. 10. Through comparison, it can be seen that FIG. 10 is substantially the same as FIG. 1, with all of the engine not being shown in FIG. 10 for purposes of simplicity. The purpose of this optional supplementary air system is for use in conjunction with the dual throttle lever mechanism, if needed. In operation, more air will be supplied through the hot intake system when cam surface 240 engages finger 212 to increase the fuel supplied to the hot system for acceleration. Thus, the additional air supplied by the heated intake system (and an associated reduction in air supplied by the cold intake) assures that the concentration of fuel in the vicinity of the spark plug is not above the 6–13% range for spark ignition as previously mentioned herein.

FIG. 10 illustrates a hot intake system which is substantially identical with intake system 26 in FIG. 1, with elements 326, 330, 332, 336, 360, 358, 334, 350A, and 348A being identical to the elements in FIG. 1 which have reference numerals reduced by a factor of three hundred. It can be seen that air passage 332 terminates in a flange 370, to which a flange 372 of mixture passage 374 is connected by conventional means, such as gaskets and bolts. It can be seen that mixture passage 374 is larger than the corresponding mixture passage 38 in the embodiment of FIG. 1, so that an additional, supplementary charge of air may be supplied through the heated intake. A passage 376 is connected to passage 374, and is similar to passage 43 in every respect except that flow passage 376 is larger for the purpose of this embodiment.

The supplementary air supply includes an air passage 378 which is interconnected at one end to passage 374 and originates at its other end in an intake 380 having a valve seat 382. A downwardly biased valve head 384 normally maintains passage 378 closed, the valve head being connected to a rod 386 which extends freely upwardly through a stationary member 388. A compression spring 390 is interposed between the valve head 384 and the stationary member 388 to bias the valve head donwardly to its normally cosed position. A lost motion link 392 is rigidly connected to the upper end of rod 386, and is slidably supported between a pair of supports 396. The lost motion link is a conventional means, including a slot 394 which slidably receives a sliding coupling member 400 that is rigidly connected to the end of an axially movable link 402. Link 402 may be connected through suitable, conventional linkage to throttle lever component 216 or the the linkage interconnecting component 216 to the vehicle accelerator pedal.

In operation, the hot intake 326 will function exactly the same as hot intake 26 when the throttle lever accelerating cam surface 240 is not in engagement with finger 212. Thus, link member 402 and coupling element 400 will slide in slot 394 of link 392 when actuating member 216 is rotated clockwise to the position where surface 240 engages finger 212. At this point coupling element 400 would be at the upper extremity of slot 394, so that as component 216 is rotated to lower finger 212, link 402 is moved vertically to raise link 392, rod 386 and valve head 384. Thus, when a richer fuel-mixture is supplied to the hot intake for acceleration, more air will be supplied. The precentage of fuel to the air in the heated intake will be maintained substantially constant, even though additional fuel is being added so that it will be assured that the fuel is dispersed within the cylinder to avoid concentrating too rich a mixture at the spark plug.

An additional linkage arrangement for activating the supplementary air supply may become desirable. In this situation, rod 386 could be interconnected by suitable linkage with the thermostat rod or finger 212, so that when finger 212 is in its lowermost position, valve 384 would be open, and similarly, when finger 212 is in its upper most position, valve 384 would be closed. This arrangement may be useful in the adequate dispersion of the fuel in the "cold full power mixture".

The method of reducing hydrocarbon emissions from the exhaust of an internal combustion engine, then, includes supplying a fuel and air mixture of approximately one-half the normal commercial engine requirement for full power output, from the carburetor 34 in FIG. 1, to the engine cylinder; concentrating the fuel in the cylinder near the spark plug to provide a combustible fuel-air mixture; increasing the engine rotational speed beyond the related known limits of piston reciprocating (sliding) speed, by utilization of the full potential of the dual induction system 22, to make up the potential power lost to the lean mixture; guiding the reciprocating pistons 64 by utilizing the unique roller crosshead assembly 72 to eliminate the connecting rod forces upon the pistons and cylinders and permit the pistons to float within the cylinders, enabling the increased engine speeds; and, by means of the roller crosshead assembly 72, enable the combustion gases blown past the piston rings 86 to be collected within the cavity 119 formed by the piston rings 86 and the sealing ring 108, and drawn off through the port 116, to prevent the combustion gases blown past the piston rings 86, from reaching the crankcase 69 wherein to contaminate the engine lubricating oil and hinder obtaining the acceptable low level of unburned hydrocarbon emission possible to be obtained by this invention. Furthermore, the roller crosshead 72 feature of removing sliding loads on the pistons enables dry lubrication such as molybdenum disulfide to be applied to the cylinder 24 wall, the piston rings 86, the piston skirt 80, the sealing ring 108 and thereby lubricate these members without use of the normal engine lubricating oil, and thereby still further reducing unburned hydrocarbon exhaust emissions and bringing them to an absolute minimum, or even total elimination thereof. The novel throttle lever mechanism feature regulates the fuel supplied by the carburetor during all phases of engine operation. This method takes full advantage of the dual induction system disclosed in my above referenced U.S. Pat. No. 2,968,297, to achieve a substantially emission-free exhaust.

The modified and improved engine of this invention permits the reduction of the number of pistons 64 and cylinders 24 of a multicylinder engine, without a corresponding decrease in the engine power output for a specific number of cubic inches of piston displacement. This improvement is accomplished by increasing the engine piston speed, as described above, in combination with the dual induction system which efficiently enables the higher piston speed to be obtained. For example, a conventional engine might have a four inch diameter piston and a four inch stroke, providing approximately a fifty cubic inch displacement per cylinder. The preferred engine of this invention will operate efficiently with the four inch stroke, at twice the normal engine speed, providing thereby, twice the piston displacement per minute of operation. This is accomplished by the utilization of the improved crosshead assembly 72 in combination with the dual induction system described above. The number of cylinders may now be decreased by increasing the diameter of the pistons. For example, if the diameter of the pistons of the engine described above are increased to 5.6 inches, the piston displacement per minute would become doubled, and then, the number of cylinders may be reduced by one-half without reducing the power output of the engine. It must be remembered that this increase in engine speed is permitted by the dual induction system, in combination with the improved crosshead of this invention and would not be possible with a conventional engine configuration. The reduction of the number of cylinders by one-half, and doubling the cylinder area while retaining the four inch stroke as described above, and doubling of the engine speed, results in the same number of impulses or firings per minute and therefore, the same torque smoothness as a conventional engine having double the number of cylinders.

The method presently proposed, thus, involves a reduction in the overall quantity of fuel supplied to the engine cylinder, and results in a reduced combustion temperature to reduce emissions of oxides of nitrogen. A reduction in hydrocarbons is achieved by concentrating the fuel at the spark plug to reduce misfirings of the lean mixture, and, by substantially reducing the amount of engine lubricating oil that usually gets into the combustion process within the cylinders. Further, because the proposed engine is capable of supplying adequate amounts of air to the cylinders, carbon dioxide can be generated rather than carbon monoxide, and thereby becomes substantially an emission free engine as defined by the U.S. Congressional Clean Air Act of 1970, as amended to 1978.

Having fully and completely disclosed my invention, I now claim:

1. A method of reducing the exhaust emissions of an internal combustion engine having a dual induction system, said dual induction system including a cold air intake and a heated fuel-air intake, a plurality of cylinders, each having a reciprocating piston, and an exhaust outlet means, a crankshaft, said engine including connecting rods interconnecting said pistons and said crankshaft, said method including the steps of:
   (a) supplying a heated fuel-air gaseous mixture through said heated fuel-air intake into a cylinder during the intake stroke of a piston reciprocating therein;
   (b) simultaneously with step (a) supplying cold intake air through said cold-air intake into said cylinder whereby the overall fuel content in the cylinder remains at approximately 4.8% of the total air volume inducted and thereby increasing the breathing capacity of said engine, said mixture being concentrated at said cylinder's spark plug, by said dual induction system, to assure consistent ignition of said mixture whereby unburned hydrocarbon emissions, carbon monoxide gas and nitrogen oxide gas are reduced;
   (c) guiding said reciprocating pistons within said cylinders by means of a crosshead assembly and guideways guiding said crossheads in the reciprocating axis of said pistons, to eliminate from said pistons the thrust force of said connecting rods and permit the pistons to float within the cylinders; and
   (d) increasing the piston sliding speed to a speed in excess of 3000 feet per minute thereby compensating for the power loss to said lower power mixture.

2. The method defined in claim 1 including the step of heating the fuel-air gaseous mixture supplied through said heated fuel-air intake into said cylinder by a manifolded induction system of the dual induction system whereby said fuel approaches the same flow characteristic of said air.

3. The method defined in claim 2, including the step of directing the heated air and fuel in the cylinder so as to concentrate the fuel at the spark plug.

4. In a method of reducing emissions of carbon monoxide, hydrocarbons and oxides of nitrogen from an internal combustion engine, the steps of:
   (1) supplying a heated fuel-air gaseous mixture into a cylinder during the intake stroke of a piston reciprocating therein;
   (2) simultaneously with step (1), supplying intake air into said cylinder;
   (3) intermixing the heated fuel-air mixture and the inducted air to achieve and maintain an overall fuel content in the cylinder of about 4.8% of the total air volume inducted;
   (4) as a result of step (1) and as a result of piston movement in the cylinder toward a top dead center position, vaporizing substantially all the fuel and concentrating the fuel in the vicinity of a spark plug in the cylinder to achieve an ignitable charge wherein the fuel content in the vicinity of the spark plug is within the range of approximately 7% to 13% of the fuel-air mixture at the instant of ignition spark timing;
   (5) igniting the fuel-air mixture and burning essentially all the fuel in the cylinder with (a) a reduction in the production of oxides of nitrogen due to a lower combustion temperature as a result of the relatively low content of fuel in the cylinder, (b) a reduction in carbon monoxide due to a large quantity of available inducted atmospheric oxygen in the cylinder and (c) a reduction in hydrocarbon emissions due to concentrating the fuel at the spark plug and the resultant complete burning of the fuel;
   (6) expelling the burned gaseous exhaust from the cylinder by reciprocating the piston within the cylinder;
   (7) sequentially repeating steps (1) through (6) and reciprocating the piston at a speed in excess of 3000 feet per minute;
   (8) axially stabilizing the piston during its reciprocation in the cylinder with a roller crosshead assembly, to (a) prevent the piston from engaging the cylinder wall and creating normally premature wear due to the increased piston reciprocation speed and (b) reduce friction from sliding the piston on the cylinder wall.

5. In a method of reducing pollutant emissions from an internal combustion engine, the steps of:
   (1) inducting a heated fuel-air gaseous mixture into a cylinder during the intake stroke of a piston reciprocating therein, the heated fuel-air gaseous mixture being inducted into the cylinder through a heated, first intake passageway;

(2) simultaneously with step (1) inducting intake air into said cylinder through a second intake passageway;

(3) intermixing the heated fuel-air mixture and the inducted air to achieve an overall fuel content in the cylinder of only about 4.8% of the total volume intake;

(4) as a result step (1) and as a result of piston movement in the cylinder toward a top dead center position, concentrating fuel in the vicinity of a spark plug in the cylinder to achieve an ignitable charge wherein the fuel content in the vicinity of the spark plug is within the range of approximately 7% to 13% of the fuel-air mixture;

(5) igniting the fuel-air mixture and burning essentially all of the fuel in the cylinder before the exhaust stroke of the piston reciprocation cycle to achieve a reduction in polluting emissions;

(6) expelling the burned gaseous exhaust from the cylinder by reciprocating the piston in the cylinder;

(7) sequentially repeating steps (1) through (6) and reciprocating the piston at a speed in excess of 3000 feet per minute; and (8) axially stabilizing the piston during its reciprocation in the cylinder with a roller crosshead assembly including a connecting rod interconnection the piston and a crankshaft, a roller rotatably received by said connecting rod, a cup-shaped piston guide member opening toward said piston and receiving the piston during reciprocation, and a pair of opposed guideways rotatably receiving said roller and extending along the reciprocating axis of said piston, such axial stabilization preventing the connecting rod forces from causing the piston to engage the cylinder wall and create wear as a result of the reciprocation speed.

6. The method defined in claim 5, including the further step of rotationally stabilizing said cup-shaped piston guide member during piston reciprocation.

7. The method defined in claim 5, wherein the roller of the roller crosshead assembly has a generally cylindrical outer surface which is slightly crowned in an axial direction, including the further step of absorbing twisting movements of the roller without the roller diametrically binding itself within said guideways, due to any twisting that may be imposed upon the roller during piston reciprocation.

8. The method defined in claim 5, including the following steps of engine operation during a cold start-up to prevent engine over-stressing and to reduce polluting emissions, said engine including a carburetor, a throttle valve in the first intake passageway and a thermostat regulator arm:

(a) preventing the throttle valve from manual opening to more than a one-half opened position until the engine has fully warmed up, by providing a throttle lever on a common shaft with the throttle valve, said throttle lever having a cam surface including an engagement surface which is engaged by the thermostat regulator arm when the engine has not fully warmed up; and (b) moving the thermostat regulator arm out of the path of the engagement surface after the engine has fully warmed up, so that the throttle valve may be fully opened to allow piston reciprocation speed up to at least 6000 feet per minute.

9. The method as defined in claim 1, wherein the heated intake is provided with a supplementary air intake passageway which is normally closed by a valve, including the further step of opening the supplementary air intake passageway only when a greater quantity of fuel is being supplied to the fuel-air mixture, and thereby maintaining the percentage of fuel to air in the heated intake relatively constant so that fuel will be properly dispersed within the cylinder for combustion.

10. The method as defined in claim 5, further including the steps of supplying fuel to the cylinder through the hot intake in amounts of up to 8% by total weight of volume intake by piston displacement, but only during periods of maximum vehicle acceleration; and dispersing the fuel within the cylinder to achieve a combustible fuel-to-air concentration at the spark plug within the range of about 6–13%.

11. The method of operating a reciprocating piston type, four stroke cycle internal combustion engine using liquid hydrocarbon fuel to reduce the air polluting exhaust emissions during any power output, said engine including; at least one cylinder, multiple supply means for supplying fuel and air to form a combustible fuel-air combination in said cylinder, and an exhaust means for said cylinder; said method including the steps of:

(a) supplying air through one of said multiple supply means into said cylinder during at least one stroke of the piston therein, (b) supplying fuel through a second of said multiple supply means to said cylinder in a quantity such that the overall fuel content, by weight, in the cylinder does not exceed about 4.8% of the weight of the air supplied to said cylinder at any power output during normal hot engine operation, (c) simultaneously with step (b) concentrating a sufficient amount of the fuel in the area of the ignition means in said cylinder, which, following ignition causes combustion of substantially the entire amount of fuel in the cylinder during the power stroke and prior to the exhaust stroke of the piston, (d) combustion of the air and fuel supplied to said cylinder in steps (a) and (b) in the quantities stated, and in combination with means associated with said piston, together enabling said piston to be reciprocated at a speed sufficiently in excess of 3000 feet per minute to produce a full power output with said 4.8% fuel air combination substantially equal to the full power output of a conventional engine of said type of equal piston displacement which utilizes a fuel and air combination wherein the fuel is about 8% by weight of the air and has a piston speed not in excess of about 3000 feet per minute at full power output;

the combination of steps (b) and (c) substantially reducing the amount of unburned hydrocarbons, carbon monoxide and oxides of nitrogen gases produced during operation of said engine as compared with said conventional engine.

12. The method of operation an engine according to claim 11, including the step of providing a means to minimize the frictional heat to which the piston is subjected as it reciprocates.

13. The method of operating an engine according to claim 11, including the step of reducing the connecting rod thrust load on the piston.

14. The method of operating an engine according to claim 11, including the step of retarding the flow of combustion generated heat into said piston during the combustion stroke of said piston.

15. The method of operating an engine according to claim 11, including the step of setting the timing of the engine so that said exhaust means fully closes before said air and fuel supply means operates to supply said fuel-air combination into said cylinder.

16. The method of operating an engine according to claim 13, including the step of preventing oil in the engine's crankcase from being pumped by said piston during reciprocation of said piston.

17. The method of operating an engine according to claim 16, including the step of withdrawing from said cylinder any combustion gases which leak past the piston sealing rings.

* * * * *